(12) United States Patent
Peters

(10) Patent No.: US 10,427,094 B2
(45) Date of Patent: Oct. 1, 2019

(54) PROCESS DESIGN FOR ACID GAS REMOVAL

(71) Applicant: Cameron Solutions, Inc., Houston, TX (US)

(72) Inventor: Richard D. Peters, Evergreen, CO (US)

(73) Assignee: Cameron Solutions, Inc., Houston, TX (US)

( * ) Notice: Subject to any disclaimer, the term of this patent is extended or adjusted under 35 U.S.C. 154(b) by 226 days.

(21) Appl. No.: 15/211,672

(22) Filed: Jul. 15, 2016

(65) Prior Publication Data
US 2017/0014753 A1    Jan. 19, 2017

Related U.S. Application Data

(60) Provisional application No. 62/193,152, filed on Jul. 16, 2015.

(51) Int. Cl.
*B01D 53/22* (2006.01)
*B01D 63/04* (2006.01)
(Continued)

(52) U.S. Cl.
CPC ......... *B01D 53/226* (2013.01); *B01D 53/229* (2013.01); *B01D 63/04* (2013.01);
(Continued)

(58) Field of Classification Search
CPC .............. B01D 63/12; B01D 2313/243; B01D 2317/025; B01D 63/04; B01D 2053/224;
(Continued)

(56) References Cited

U.S. PATENT DOCUMENTS

| 7,429,287 B2 | 9/2008 | Frantz |
| 2012/0000355 A1 | 1/2012 | Sharma et al. |

(Continued)

FOREIGN PATENT DOCUMENTS

WO    2012050816 A2    4/2012

OTHER PUBLICATIONS

Perry Perry's Chemical Engineers Handbook, The McGraw-Hill Companies, Inc., 7th Ed. 1999, p. 22-56.*

*Primary Examiner* — Anthony R Shumate
(74) *Attorney, Agent, or Firm* — Hauptman Ham, LLP

(57) ABSTRACT

A membrane permeation system and process accommodates varying acid gas inlet concentrations over time while utilizing only the initially installed equipment and still maintaining the non-permeate gas specification. The system and process provide flexibility to operate efficiently over a wide range of inlet $CO_2$ concentrations by adjustments to primary permeate, secondary permeate, and recycle gas operations. The glassy polymer membrane devices used in the system and process are selected so removal duty efficiency increases as acid gas concentration increase. Designing the system and process to handle about a 15% increase in acid gas concentrations over initial conditions effectively treats acid gas concentrations well above that 15% increase, thereby eliminating the need for additional equipment or for additional downstream amines and physical solvents.

17 Claims, 2 Drawing Sheets

(51) Int. Cl.
  *B01D 63/12* (2006.01)
  *B01D 71/16* (2006.01)
  *C10L 3/10* (2006.01)

(52) U.S. Cl.
  CPC .............. *B01D 63/12* (2013.01); *B01D 71/16* (2013.01); *C10L 3/102* (2013.01); *C10L 3/103* (2013.01); *C10L 3/104* (2013.01); *B01D 2053/221* (2013.01); *B01D 2053/224* (2013.01); *B01D 2313/243* (2013.01); *B01D 2317/025* (2013.01); *B01D 2325/20* (2013.01); *C10L 2290/10* (2013.01); *C10L 2290/46* (2013.01); *C10L 2290/548* (2013.01); *C10L 2290/562* (2013.01); *C10L 2290/565* (2013.01); *C10L 2290/58* (2013.01)

(58) Field of Classification Search
  CPC ............ B01D 2053/221; B01D 53/229; B01D 71/16; B01D 2325/20; B01D 53/226; C10L 3/104; C10L 2290/30; C10L 3/102; C10L 2290/548; C10L 3/103; C10L 2290/565; C10L 2290/562; C10L 2290/10
  See application file for complete search history.

(56) References Cited

U.S. PATENT DOCUMENTS

| | | | |
|---|---|---|---|
| 2013/0058853 A1* | 3/2013 | Baker | B01D 53/22 423/228 |
| 2013/0098242 A1* | 4/2013 | Ungerank | B01D 53/226 95/51 |
| 2016/0231051 A1* | 8/2016 | Shah | C01B 23/0042 |
| 2016/0256818 A1* | 9/2016 | Gerber | B01D 53/226 |
| 2016/0288047 A1* | 10/2016 | Fukuda | B01D 63/02 |
| 2016/0346727 A1* | 12/2016 | Yeo | B01D 53/226 |
| 2017/0320009 A1* | 11/2017 | Hirata | B01D 53/226 |
| 2017/0320736 A1* | 11/2017 | Voss | B01D 53/226 |

* cited by examiner

PROCESS DESIGN FOR ACID GAS REMOVAL

CROSS-REFERENCE TO RELATED APPLICATIONS

The present application claims priority to U.S. Provisional Patent Application No. 62/193,152 filed on Jul. 16, 2015, which is incorporated herein by reference.

BACKGROUND OF THE INVENTION

This invention relates to systems and methods used to remove acid gas ($CO_2$ and $H_2S$) from a natural gas stream. More specifically, the invention relates to systems and methods designed to remove those acid gases by membrane permeation and not using amines or physical solvents.

The total volume of acid gas removed by traditional acid gas removal technologies such as amines and physical solvents is limited by size of the contactors and the initial installed volume of solvent and the regeneration rates. Because of this, if acid gas removal requirements increase—due to higher acid gas concentrations in the inlet gas—by more than the original design margin (typically between 5% and 10% higher than design basis), more equipment must be added to process the gas. In practice, it is common that for natural gas fields containing concentrations of CO2, it is likely that the CO2 content in the inlet gas will increase over the life of the project. The same is true of $H_2S$.

Gas reservoirs have finite useful production lifetimes. Therefore large users of natural gas, such as LNG plants, electric power generation plants and gas pipelines typically receive produced gas from one or more wells or fields with each well or field having different combinations of natural gas and acid gases over a 20-30 year timeframe. Often gas is supplied from different gas fields with different acid gas percentages and the different gas streams are blended together to form the feed gas.

Because of this, gas compositions change with varying production volumes and acid gas compositions from the individual wells contributing gas to the blended feed gas. This change is amplified by the common practice of gas production companies to produce the most economical, low acid gas wells first, in order to maximize early financial returns. The practice results in producing gas with higher and higher acid gas compositions over time.

The actual long-term production profile of the gas field and acid gas composition profile is often highly uncertain at the time that the initial acid gas processing equipment is installed upstream of the LNG, power plant of the pipeline. As a result, it is common that additional acid gas removal must be added at some later date. In efforts to keep the total cost of the acid gas system low, the acid gas removal systems are often not initially designed to handle inlet gas at the high range of inlet acid gas compositions over the field production lifetime. Therefore, new acid gas processing equipment and associated compression are typically added in phases (e.g., Phase 1, Phase 2, . . . Phase N), which adds considerable capital cost to operations.

A need exists to keep the size of the initial acid gas processing system as small as practical, but still flexible enough to avoid adding additional equipment to that system over time as acid gas concentrations increase in the feed stream.

SUMMARY OF THE INVENTION

A system and process design for acid gas ($CO_2$ and $H_2S$) removal makes use of membrane permeation in combination with a flexible equipment and control system configuration to allow maximal efficiency to use the initially installed pretreatment, membrane permeation, and compression equipment yet handle a very wide range of inlet gas compositions over the life of the project while maintaining non-permeate gas specification. The system and process operate efficiently over a wide range of inlet $CO_2$ concentrations by adjustments to primary permeate, secondary permeate, and recycle gas operations.

In a embodiments, a primary membrane unit or train is positioned in series with a secondary membrane unit or train. Preferably, each unit incorporates spiral wound or hollow fiber membranes with glassy polymers such as but not limited to cellulose triacetate or cellulose acetate that provide increasing efficiency and capacity as acid gas inlet concentrations increase over time.

As $CO_2$ or $H_2S$ inlet concentrations increase, permeate flow increases from the primary membrane unit. For certain glassy polymer membranes, in either a spiral wound or hollow fiber configuration, the rate of permeation (flux) increases with the rise in inlet $CO_2$ gas composition so the system can remove more acid gas at higher inlet $CO_2$ percentages, and unlike solvent systems which have fixed acid gas removal capacity. As a result, often the original membrane acid gas $CO_2$ removal system equipment can be used for all of the future processing even though the acid gas inlet composition has increased, unlike solvent or amine systems which would require future equipment expansions. All or some portion of the permeate flow can be compressed and routed to the second membrane unit, with another portion bypassing compression and being routed to a downstream process such as a thermal oxidizer, flare, low (200 to 300) BTU fuel gas system, or compressed and re-injected.

All or a portion of the non-permeate flow from the secondary membrane unit can be compressed in a recycle loop and blended with the inlet gas stream to the primary membrane unit, with another portion of the non-permeate flow routed as a fuel gas. Permeate flow from the secondary membrane unit is routed to a downstream process such as the thermal oxidizer, flare, low BTU fuel gas system, or compressed and re-injected.

In addition to reducing phase expansion capital costs, this system and process allows end users access to a greater variety of future gas supply sources that would otherwise be unavailable without another conventional acid gas removal phase expansion.

In a preferred embodiment of the system, the system includes:
  a primary membrane unit arranged to receive an inlet natural gas stream containing an acid gas and housing at least one glassy polymer membrane device;
  a compressor arranged to receive at least a portion of a permeate flow exiting the primary membrane unit;
  a bypass loop arranged to receive at least a portion of the permeate flow exiting the primary membrane unit;
  means for controlling the permeate flow to the compressor and the bypass loop;
  a secondary membrane unit arranged to receive a compressed permeate flow from the compressor and housing at least one glassy polymer membrane device; and
  a recycle loop having a compressor arranged to receive a non-permeate flow exiting the secondary membrane unit;
wherein a total quantity "Q" of the glassy polymer membrane devices of the system is $$Q=Y(M_B+N_B), XC_B \rightarrow C_s$$

where "$M_B$" and "$N_B$" is a predetermined quantity of glassy polymer membrane devices in the primary and secondary units, respectively, effective to reduce an expected minimum acid gas content "$C_B$" of the inlet natural gas stream to a required non-permeate acid gas content specification "$C_S$"; and where "$Y(M_B+N_B)$" is effective to reduce an acid gas content $XC_B$ of the inlet natural gas stream to the required non-permeate acid gas content specification $C_S$ when X≤Y and when X>Y, Y is in a range of 1.1 to 1.3; X is in a range of 1.0 to 3.5.

A preferred embodiment of a membrane permeation process to operate with varying acid gas inlet concentrations of a natural gas inlet stream over time while utilizing only the initially installed equipment and maintaining a same non-permeate gas specification over time includes the steps of:

passing an inlet gas stream through a primary membrane unit housing at least one glassy polymer membrane device;

compressing at least a portion of a permeate flow exiting the primary membrane unit;

optionally, routing a portion of the permeate flow existing the primary membrane unit to a bypass loop;

removing an acid gas from the compressed permeate flow by passing the compressed permeate flow through a secondary membrane unit housing at least one glassy polymer membrane device;

compressing at least a portion of a non-permeate flow exiting the secondary membrane unit; and recycling the compressed non-permeate flow to the inlet gas stream;

wherein a total quantity "Q" of the glassy polymer membrane devices of the process is the same as that described above for the above the system.

ELEMENTS AND NUMBERS USED IN THE DRAWINGS

Figure 1:
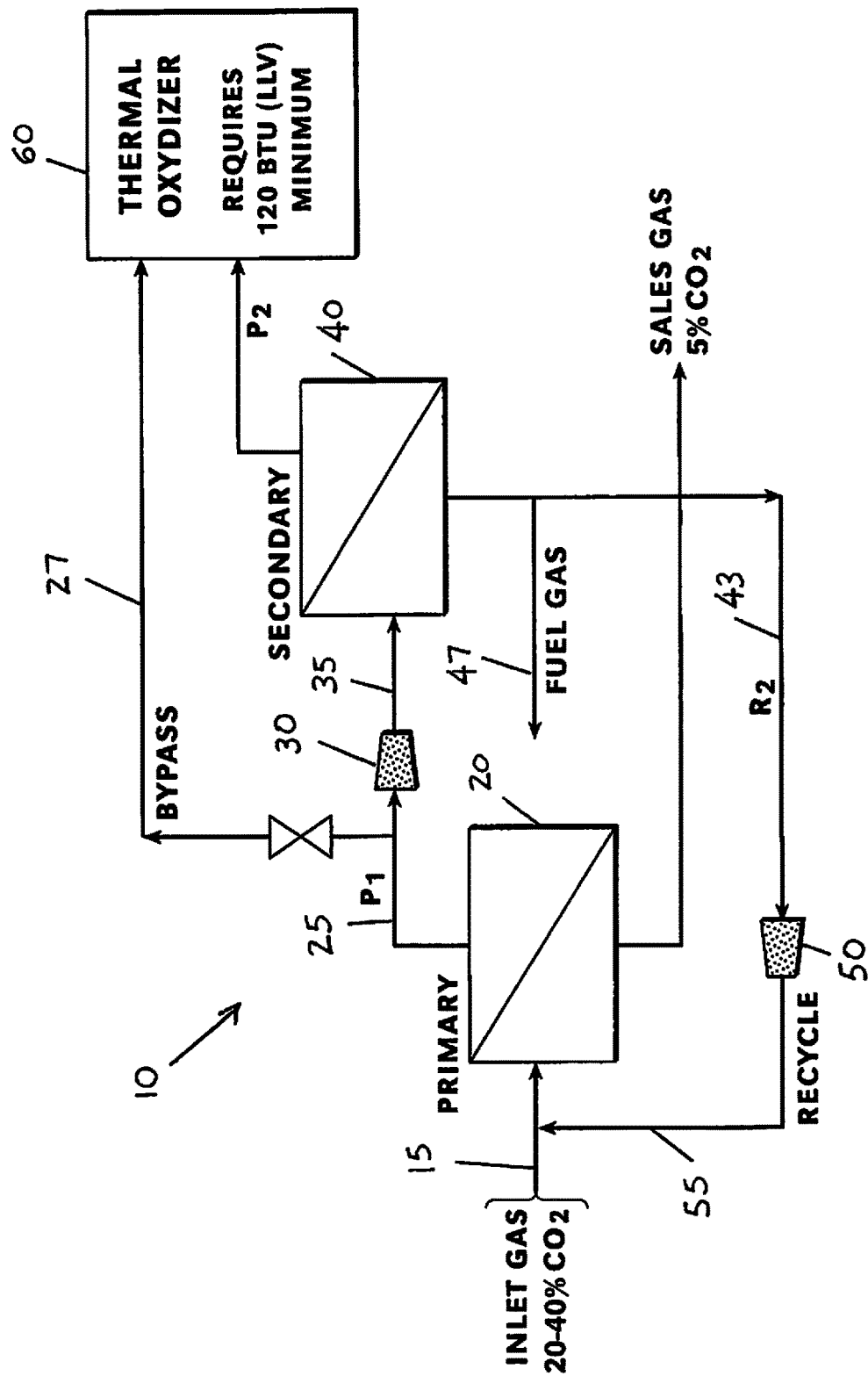
FIG. 1 is a schematic of a preferred embodiment of a system and process for acid gas removal by membrane permeation. A flexible equipment and control system configuration allows maximal efficiency and continued use of the initially installed pretreatment, membrane and compression equipment to handle a very wide range of inlet gas compositions over the life of the project.

10 System and process
15 Inlet natural gas stream
20 Primary membrane unit or train
23 Non-permeate stream (sales gas)
25 Permeate flow stream
27 Portion of permeate stream bypassing compression
30 Compressor or compression step
35 Compressed permeate stream
40 Secondary membrane unit or train
43 Non-permeate flow or stream
45 Permeate flow or stream
47 Fuel gas
50 Compressor or compression step
55 Compressed non-permeate stream
60 Thermal oxidizer (could also be a flare or some other downstream process)

DETAILED DESCRIPTION OF THE PREFERRED EMBODIMENTS

Figure 2:
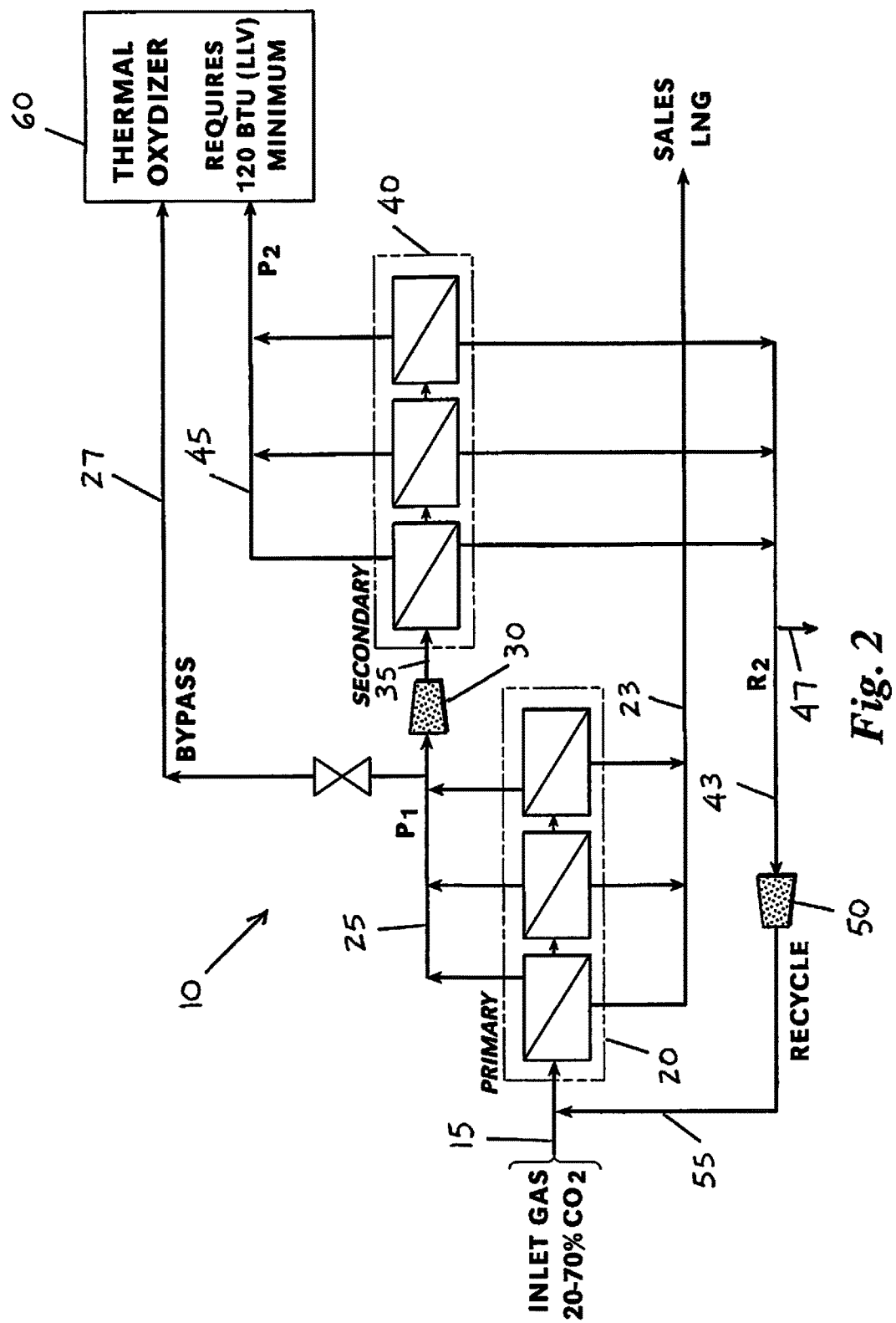
FIG. 2 is a schematic of another preferred embodiment of the system and process, with the primary and secondary membrane units arranged in series as trains.

Referring to FIGS. 1 and 2, embodiments of a system and process 10 for acid gas removal are arranged to receive an inlet natural gas stream 15 from one or more natural gas wells or fields. Although the inlet natural gas stream 15 increases in acid gas concentration over time, the system and process 10 accommodate this increase without additional equipment being added and without relying upon any increase in downstream amines or physical solvents. The glassy polymer membranes used in the system and process 10 are selected so removal duty efficiency increases as acid gas concentration increase. Designing the system and process to handle about a 15% increase in acid gas concentrations over initial conditions effectively treats acid gas concentrations well above that 15% increase, thereby eliminating the need for additional equipment or additional downstream amines or physical solvents.

In one preferred embodiment, the glassy polymer membranes are arranged in a primary and a secondary membrane unit to handle acid gas concentrations more than twice that of the base (lowest expected) acid gas concentration at the same inlet gas flow rates. In another preferred embodiment, the glassy polymer membranes are arranged in a primary and a secondary membrane train to handle acid gas concentrations at the same inlet gas flow rates up to 3.5 times or more than that of the base acid gas concentration (e.g. 20% $CO_2$ increasing to 70%). Also, as the acid gas concentration in the inlet gas increases, the existing membrane plant inlet flow capacity could simultaneously increase up to 20% to 25% without adding additional equipment.

The system and process 10 use a primary membrane unit or train 20 arranged to receive the inlet gas stream 15 using one or more membrane steps that incorporate spiral wound or hollow fiber glassy polymer membranes and a secondary membrane unit or train 40 arranged in series to the primary unit or train 20 and uses one or more membrane steps that incorporate spiral wound or hollow fiber glassy polymer membranes. The secondary unit or train 40 receives all or a portion of the permeate stream 25 exiting the primary unit or train 20. Each unit or train 20, 40 incorporates spiral wound or hollow fiber glassy polymer membranes. When arranged as a train, the membranes within each train 20, 40 are in series with one another so that a portion of the permeate can be routed to an immediate downstream membrane unit within the train 20 or 40, and permeate pressures within the trains can be adjusted to match the current process requirements.

As $CO_2$ or $H_2S$ inlet concentrations increase, permeate flow 25 increases from the primary membrane unit or train 20. All or some portion of the permeate flow 25 can be compressed 30 and a compressed permeate stream 35 is routed to the secondary membrane unit or train 40, with another portion 27 bypassing compression 30 and being routed to a thermal oxidizer 60.

All or a portion of the non-permeate flow 43 from the secondary membrane unit or train 40 can be compressed 50 in a recycle loop and blended with the inlet natural gas stream 15 flowing into the primary membrane unit or train 20. Another portion of the non-permeate flow 43 can be routed as a fuel gas 47. Similar to the bypass permeate flow 27 from the primary membrane unit or train 20, permeate flow 45 from the secondary membrane unit or train 40 is routed to the thermal oxidizer 60.

Preferably, the glassy polymers used in each unit or train 20, 40 are the same type or kind of glassy polymer as those used in the other unit or train 40, 20, although the quantity or surface area of the membranes can differ between the two. Regardless of the quantity of glassy polymer or the surface area, the glassy polymer selected should be one that can provide increasing efficiency as $CO_2$ or $H_2S$ acid gas inlet concentrations increase over time. Examples of glassy polymers include but are not limited to cellulose acetate, cellulose triacetate, polyimide, polyamide, polysulfone, and multi-layer composite membranes in either spiral wound or hollow fiber configurations.

By way of example, a cellulose triacetate membrane can provide increasing efficiency as acid gas inlet concentrations increase over time. The $CO_2$ removal capacity of this particular hollow fiber membrane gets increasingly higher as inlet $CO_2$ concentration increase due to increasing partial pressures of $CO_2$ in the inlet gas stream and $CO_2$ solubility enhanced flux of the glassy polymer. Note that the same holds true for $H_2S$, which typically tracks along with the rate of $CO_2$ permeation.

In an example case, at the same inlet flow rate the total $CO_2$ removal duty increases 233% for an inlet gas stream that increases from 20% to 40% $CO_2$ and up to 367% for an inlet gas stream that increases to 60% $CO_2$ (see Table 1). Although acid gas concentration has doubled and tripled from base conditions, a preferred embodiment of the system and process need only be initially designed for 115% of base conditions to handle all cases, including 70% $CO_2$. In other words, increasing the total amount of the glassy polymers used in the units 20, 40 in range of 1.05 to 1.3 relative to the total amount needed to handle base conditions—and even more preferably about in a range of about 1.1 to 1.2—provides a removal duty in a range of 2 to 3.5 times that relative to the base case. This kind of increasing efficiency with rising $CO_2$ concentration is not found or achievable in conventional amine or physical solvent systems. Additionally, operating costs at higher acid gas concentrations are significantly lower than traditional designs.

TABLE 1

Example system and process efficiency with increasing $CO_2$ concentrations. Operation at 650 psia, assuming 2500 MM inlet gas, and 6% $CO_2$ outlet from membranes

| Inlet $CO_2$% | $CO_2$ Removal Duty (mmscfd) | $CO_2$ Removal Duty as a % of Base Case | Quantity of Membranes as % increase over Base |
|---|---|---|---|
| 20 | 375 | 100 | Base 100 |
| 27 | 550 | 147 | 110 |
| 30 | 625 | 167 | 113 |
| 35 | 750 | 200 | 115 |
| 40 | 875 | 233 | 113 |
| 60 | 1375 | 367 | 111 |

In addition to the primary and secondary membrane units or trains 20, 40, other aspects of the system and process design 10 can be optimized, including the primary permeate compression 30, recycle compression 50, and control systems and piping configurations controlling the amount of permeate 25 bypassing the secondary membrane unit or train 40 and the amount of non-permeate 43 being recycled from this unit or train 40. Compression 30, 50 capacity could also be diverted to sales gas booster compression or to boost final outlet permeate gas pressure. This approach enables seamless operations as $CO_2$ or $H_2S$ concentrations increase in the inlet stream 15.

For example, low inlet $CO_2$ gas requires a higher percentage of primary permeate gas 25 to be compressed 30 and sent to the secondary membrane unit or train 40 for additional hydrocarbon recovery. By contrast, when operating at higher inlet $CO_2$ conditions, more primary permeate gas 25 can bypass compression 30 and the secondary membrane unit 40 yet still achieve hydrocarbon recovery goals. Bypassing the secondary membrane unit 40 allows the redeployment of some or all of the former compression 30 or 50 to other duties, such as sales gas booster compression or, in the case of enhanced oil recovery, the former compression 30 or 50 can be redeployed to boost final outlet permeate gas pressure to reduce downstream reinjection compression requirements. The flexibility of this design allows for changes to other equipment duties. For example, as $CO_2$ or $H_2S$ increases in the inlet gas stream 15, the gas flow volumes from the primary and secondary membrane units or trains 20, 40 change significantly. This, in turn, requires changes in compression and flow control to optimize performance.

Use of the primary permeate 25 compression 30 can be adjusted with the recycle compression 50 as the gas flows in and out of compression change, or gas flow to compression 30 may be reduced by means of flow balancing that bypasses the secondary permeate and sales gas service. Additionally, the initial quantity of membranes used can be reconfigured or adjusted between identical designed primary and secondary membrane units or trains 20, 40.

The total quantity "Q" of serial arranged glassy polymer membrane devices used in system and process 10 is:

$$Q = Y(M_B + N_B), XC_B \rightarrow C_s \quad \text{(Eq. 1)}$$

where $M_B$ and $N_B$ is a predetermined quantity of glassy polymer membrane devices in membrane unit or train 20 and 40, respectively, effective to reduce an expected minimum (base case) acid gas content "$C_B$" of the inlet gas stream (e.g. 20%, 25% $CO_2$) to a required non-permeate acid gas content specification "$C_s$" (e.g. 5%, 6% $CO_2$); and where $Y(M_B + N_B)$ is effective to reduce an acid gas content $XC_B$ of the inlet natural gas stream to the required non-permeate acid gas content specification $C_S$ when $X \leq Y$ and when $X > Y$; X is in a range of 1.0 to 3.5, Y is in a range of 1.05 to 1.3, more preferably in a range of 1.1 to 1.2.

Note that Y affects the capital cost and X/Y is the increased efficiency relative to the capital cost. In the inventive system and process, Y<X through a wide range of inlet acid gas conditions to achieve the same non-permeate acid gas content specification. Because the rate of acid gas permeation (flux) in certain glassy polymer membranes increases with the rise in inlet $CO_2$ gas composition so the system can remove more acid gas at higher inlet $CO_2$ percentages, and unlike solvent systems which have fixed acid gas removal capacity, the Q glassy polymer devices can effectively treat, without additional equipment, acid gas content well above 15% and up to 350% over base conditions for a given inlet gas stream flow rate.

The preferred embodiments of the system and process are provided as illustrative examples. The following claims define the scope of the invention and include the full range of equivalents to which the recited elements are entitled.

What is claimed:

1. A system comprising:
    a primary membrane unit arranged to receive an inlet natural gas stream containing an acid gas and housing a quantity "$YM_B$" of first membrane devices;
    a compressor arranged to receive at least a portion of a permeate flow exiting the primary membrane unit;

a bypass loop arranged to receive at least a portion of the permeate flow exiting the primary membrane unit;

a secondary membrane unit arranged to receive a compressed permeate flow from the compressor and housing a quantity "$YN_B$" of second membrane devices; and a recycle loop having a compressor arranged to receive a non-permeate flow exiting the secondary membrane unit;

wherein $M_B+N_B$ is a predetermined quantity of said membrane devices required for a first removal duty to reduce a first acid gas concentration "$C_B$" of the inlet natural gas stream to an acid gas concentration "$C_s$" of a final outlet natural gas stream; and wherein $YM_B+YN_B$ is a quantity of said membrane devices required for a second higher removal duty to reduce a second acid gas concentration "$XC_B$" of the inlet natural gas stream to the acid gas concentration $C_S$ of the final outlet natural gas stream; and wherein $1.1<X\leq3.5$; and wherein $1.1\leq Y\leq1.3$.

2. A system according to claim 1 further comprising the first and second membrane devices including a spiral wound glassy polymer membrane device.

3. A system according to claim 1 further comprising the first and second membrane devices including a hollow fiber glassy polymer membrane device.

4. A system according to claim 1 further comprising the first and second membrane devices including a membrane selected from the group consisting of cellulose acetate, cellulose triacetate, polyimide, polyamide, polysulfone, and multi-layer composite.

5. A system according to claim 1 further comprising a thermal oxidizer arranged to receive the portion of the permeate flow exiting the primary membrane unit and a permeate flow exiting the secondary membrane unit.

6. A system according to claim 1 further comprising a low fuel gas system arranged to receive a portion of the non-permeate flow exiting the secondary membrane unit.

7. A system according to claim 1 wherein $1.1\leq Y\leq1.2$ and wherein $1.15\leq X\leq3.5$.

8. A system according to claim 1, wherein $1.15<Y\leq1.3$.

9. A membrane permeation process to achieve an outlet natural gas stream containing an acid gas concentration "$C_S$", the process comprising:

passing an inlet natural gas stream through a primary membrane unit housing a quantity "$YM_B$" of first membrane devices, the inlet natural gas stream to the primary unit containing a first acid gas concentration "$C_B$" and, over time, a second different higher acid gas concentration "$XC_B$", where $C_B>C_S$ and $1.1<X\leq3.5$; and passing at least a portion of a permeate flow exiting the primary membrane unit through a secondary membrane unit arranged in series with the primary membrane unit; the secondary membrane unit housing a quantity "$YN_B$" of second membrane devices;

wherein $M_B+N_B$ is a predetermined quantity of said membrane devices required for a first removal duty to reduce the first acid gas concentration $C_B$ to the acid gas concentration $C_s$; and wherein $YM_B+YN_B$ is a quantity of said membrane devices required for a second higher removal duty to reduce the second acid gas concentration $XC_B$ to the acid gas concentration $C_s$; and wherein $1.1\leq Y\leq1.3$.

10. A process according to claim 9 wherein the first and second membrane devices include a spiral wound glassy polymer membrane device.

11. A process according to claim 9 wherein the first and second membrane devices include a hollow fiber glassy polymer membrane device.

12. A process according to claim 9 wherein the first and second membrane devices include a membrane selected from the group consisting of cellulose acetate, cellulose triacetate, polyimide, polyamide, polysulfone, and multi-layer composite.

13. A process according to claim 9 further comprising routing a portion of the permeate flow exiting the primary membrane unit and a permeate flow exiting the secondary membrane unit to a thermal oxidizer.

14. A process according to claim 9 further comprising routing a portion of the non-permeate flow exiting the secondary membrane unit to a low fuel gas system.

15. A process according to claim 9 further comprising:
compressing at least a portion of a permeate flow exiting the primary membrane unit; and
routing a portion of the permeate flow existing the primary membrane unit to a bypass loop.

16. A process according to claim 9 further comprising:
compressing at least a portion of a non-permeate flow exiting the secondary membrane unit; and
recycling the compressed non-permeate flow to the inlet natural gas stream.

17. A process according to claim 9, wherein $1.15\leq Y\leq1.3$.

* * * * *